United States Patent
Zhu

(10) Patent No.: US 11,035,246 B2
(45) Date of Patent: Jun. 15, 2021

(54) METHOD AND SYSTEM FOR DETECTING FAN BLADE STRUCTURAL FAILURE

(71) Applicant: PRATT & WHITNEY CANADA CORP., Longueuil (CA)

(72) Inventor: Li Zhu, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/246,721

(22) Filed: Jan. 14, 2019

(65) Prior Publication Data

US 2020/0224551 A1 Jul. 16, 2020

(51) Int. Cl.
*F01D 21/14* (2006.01)
*G01M 15/14* (2006.01)
*F01D 21/00* (2006.01)

(52) U.S. Cl.
CPC ........... *F01D 21/14* (2013.01); *F01D 21/003* (2013.01); *G01M 15/14* (2013.01)

(58) Field of Classification Search
CPC ...... G01M 15/14; F01D 21/045; F01D 21/14; F01D 21/04; F01D 21/06; F01D 21/00; F01D 21/003; F01D 21/02
See application file for complete search history.

(56) References Cited

U.S. PATENT DOCUMENTS

| | | | |
|---|---|---|---|
| 6,768,938 B2 | 7/2004 | McBrien et al. | |
| 6,932,560 B2 | 8/2005 | Brooks | |
| 8,297,915 B2 | 10/2012 | Kang et al. | |
| 8,943,876 B2 * | 2/2015 | Rowe | G01M 13/02 73/112.01 |
| 9,719,366 B2 | 8/2017 | Yu et al. | |
| 9,840,935 B2 | 12/2017 | Khibnik | |
| 2007/0250245 A1 * | 10/2007 | van der Merwe | F01D 21/045 701/100 |
| 2011/0178772 A1 | 7/2011 | Gerez et al. | |
| 2017/0356302 A1 | 12/2017 | Descamps et al. | |

FOREIGN PATENT DOCUMENTS

EP 1312766 5/2003

OTHER PUBLICATIONS

European Search Report for EP application No. 20151807.3, dated Apr. 8, 2020.

* cited by examiner

*Primary Examiner* — Richard A Edgar
(74) *Attorney, Agent, or Firm* — Norton Rose Fulbright Canada LLP

(57) ABSTRACT

Methods and systems for detecting a structural failure of a fan blade of a fan rotor of an engine are described herein. A fan rotor speed and an engine vibration parameter are obtained. A rate of change of the fan rotor speed is compared to a deceleration threshold and the engine vibration measurement is compared to a vibration threshold. Structural failure of the fan blade is detected when the engine vibration measurement exceeds the vibration threshold for a period of time and the rate of change of the fan rotor speed is below the deceleration threshold. In response to detecting the structural failure, an alert indicative of the structural failure is triggered.

16 Claims, 6 Drawing Sheets

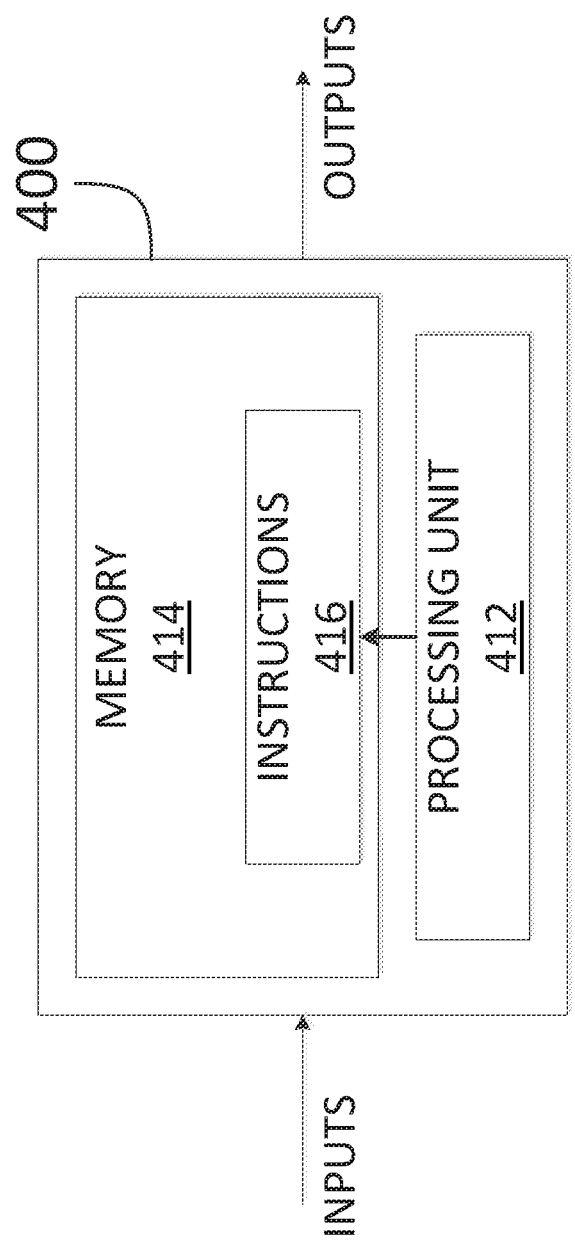

METHOD AND SYSTEM FOR DETECTING FAN BLADE STRUCTURAL FAILURE

TECHNICAL FIELD

The present disclosure relates generally to gas turbine engines, and more particularly to failure detection of engine fan blades.

BACKGROUND OF THE ART

For turbofan aircraft engines, a structural failure of a fan blade can occur during flight. This fan blade structural failure is commonly referred to as "fan blade off" and corresponds to all or part of a fan blade breaking off of an engine's fan rotor. A fan blade off event is a critical engine failure, which causes the engine to be inoperable. A pilot conventionally uses his or her judgement to determine when a fan blade off event has occurred and then shutdown the engine. However, if the engine is not shutdown in a timely manner, it can lead to fragments of the fan blade penetrating the outer casing of the engine or cause significant vibrations that may result in the engine being torn loose from the aircraft.

As such, there is need for improvement.

SUMMARY

In one aspect, there is provided a method for detecting a structural failure of at least one fan blade of a fan rotor of an engine. The method comprises obtaining a fan rotor speed and an engine vibration parameter, comparing a rate of change of the fan rotor speed to a deceleration threshold, comparing the engine vibration parameter to a vibration threshold, detecting the structural failure of the at least one fan blade when the engine vibration parameter exceeds the vibration threshold for a period of time and the rate of change of the fan rotor speed is below the deceleration threshold, and in response to detecting the structural failure, triggering an alert indicative of the structural failure of the at least one fan blade.

In another aspect, there is provided a system for detecting a structural failure of at least one fan blade of a fan rotor of an engine. The system comprises a processing unit and a non-transitory computer-readable memory having stored thereon program instructions. The program instructions are executable by the processing unit for obtaining a fan rotor speed and an engine vibration parameter, comparing a rate of change of the fan rotor speed to a deceleration threshold, comparing the engine vibration parameter to a vibration threshold, detecting the structural failure of the at least one fan blade when the engine vibration parameter exceeds the vibration threshold for a period of time and the rate of change of the fan rotor speed is below the deceleration threshold, and in response to detecting the structural failure, triggering an alert indicative of the structural failure of the at least one fan blade.

BRIEF DESCRIPTION OF THE DRAWINGS

Reference is now made to the accompanying figures in which:

FIG. 5 is a block diagram of an example computing device for detecting structural failure of a fan blade, in accordance with an illustrative embodiment.

It will be noted that throughout the appended drawings, like features are identified by like reference numerals.

DETAILED DESCRIPTION

Methods and systems for detecting a structural failure of a fan blade of an engine are described herein. The structural failure of a fan blade refers to all or part of a fan blade breaking off of a fan rotor of the engine. The structural failure of the fan blade may be referred to as "fan blade off".

Figure 1:
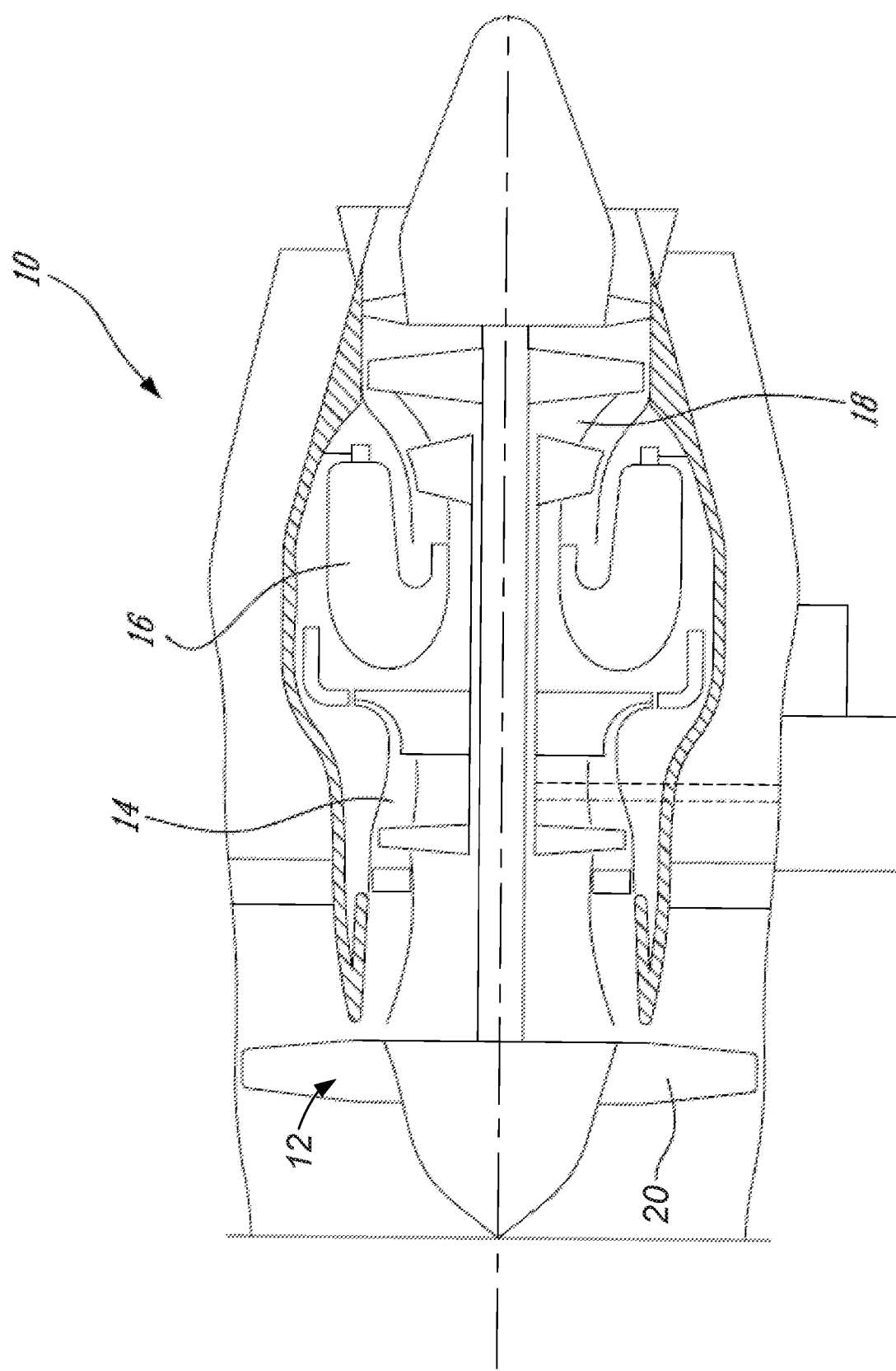
FIG. 1 is a schematic of an example gas turbine engine, in accordance with an illustrative embodiment.

FIG. 1 illustrates a gas turbine engine 10 for which a structural failure of a fan blade may be detected using the methods and systems described herein. Engine 10 generally comprises in serial flow communication: a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor 12 comprises a plurality of fan blades 20. Note that while the engine 10 is a turbofan engine, the detection methods and systems described herein may be applicable to any other types of aircraft engine having fan blades.

Figure 2:
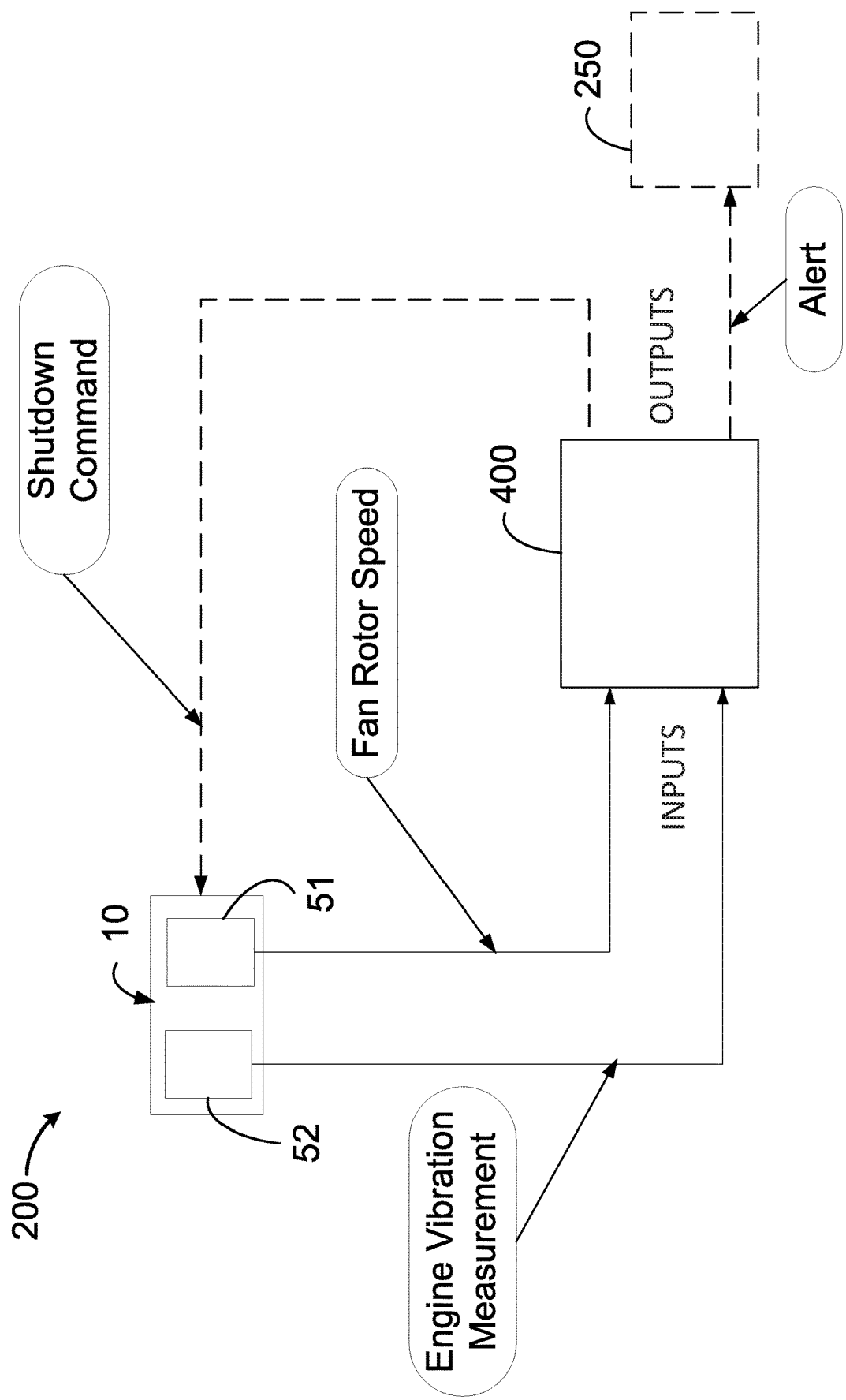
FIG. 2 is a schematic diagram illustrating a system for detecting structural failure of a fan blade, in accordance with an illustrative embodiment.

With reference to FIG. 2, there is illustrated a system 200 for detecting structural failure of one of the fan blades 20 in accordance with an embodiment. In this embodiment, a computing device 400 obtains a fan rotor speed measurement of the fan rotor 12 from at least one speed sensor 51 and an engine vibration measurement of the engine 10 from a least one vibration sensor 52. The computing device 400 is configured to determine a rate of change of the fan rotor speed (N1DOT). The computing device 400 is configured to detect the structural failure of one of the fan blades 20 when the rate of change of the fan rotor speed is below a deceleration threshold and the engine vibration measurement (or an engine vibration parameter determined from the engine vibration measurement) exceeds a vibration threshold for a period of time. In response to detecting the structural failure, the computing device 400 is configured to trigger an alert indicative of the structural failure. For example, triggering of the alert may comprise outputting the alert to an aircraft computer 250 for displaying an indication of the structural failure in a cockpit of the aircraft. The computing device 400 may also output a shutdown command for the engine 10 to shut down the engine 10 in response to detecting the structural failure. While the computing device 400 is illustrated as separate from the engine 10, this is for illustrative purposes.

Figure 3A:
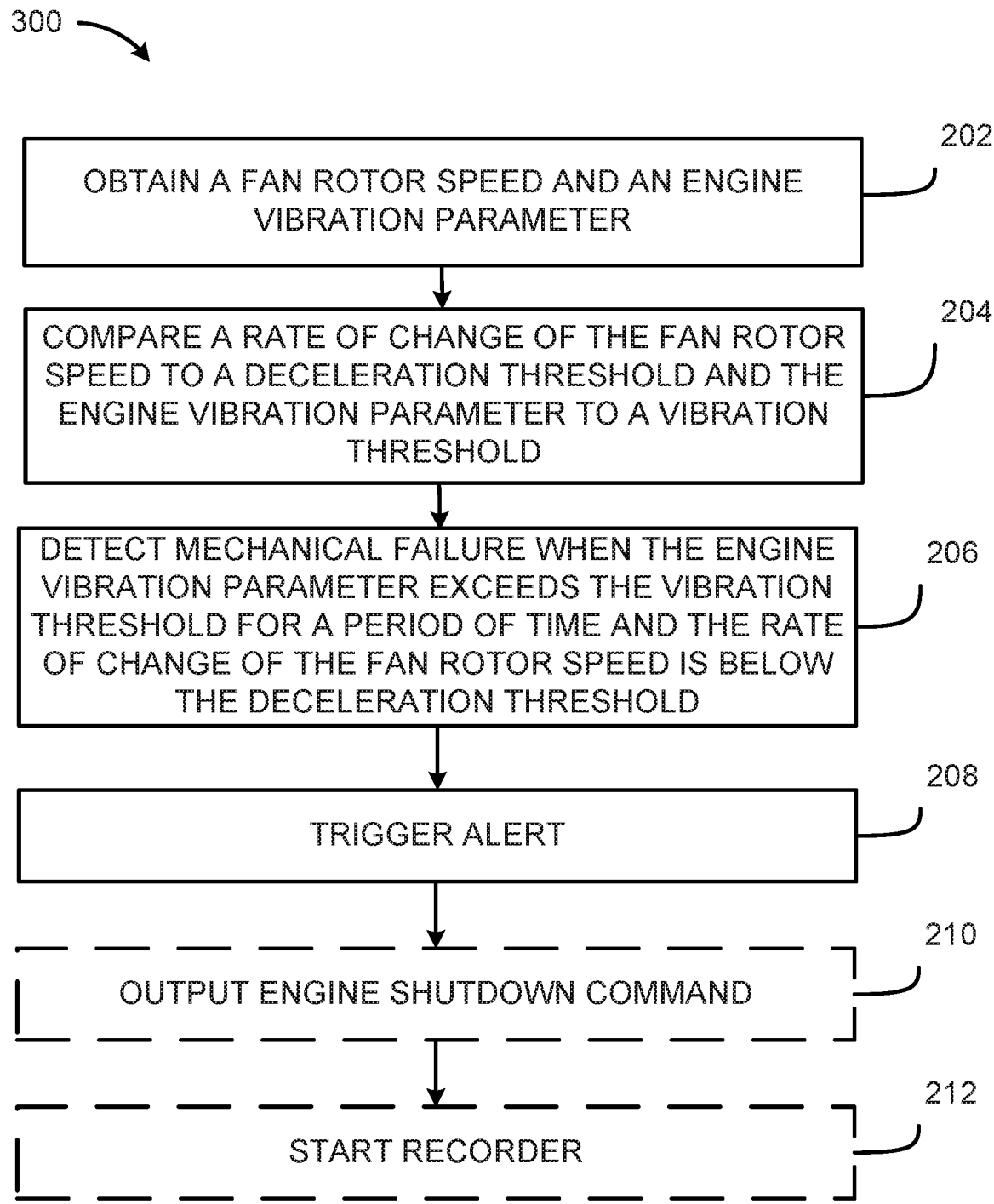
FIG. 3A is a flowchart of a method for detecting structural failure of a fan blade, in accordance with an illustrative embodiment.

With reference to FIG. 3A, there is illustrated a flowchart of a method 300 for detecting structural failure of a fan blade of a fan rotor of an engine with the computing device 400, in accordance with some embodiments. More specifically, the method 300 illustrates the configuration of computing logic of the computing device 400 in accordance with a specific and non-limiting example of implementation.

At step 202, the fan rotor speed and an engine vibration parameter are obtained. The engine vibration parameter is indicative of vibrations of the engine 10 and/or at least one component of the engine 10. In some embodiments, the engine vibration parameter is an engine vibration measurement indicative of the total vibrations for the engine 10. In some embodiments, the engine vibration parameter is a vibration level of the fan rotor 12. The fan rotor speed measurement may be obtained from a speed measuring device comprising one or more sensors for measuring the rotational speed of the fan rotor 12. The engine vibration measurement may be obtained from a vibration measuring device comprising one or more sensors for measuring vibrations of the engine 10. The vibration level of the fan rotor 12 may be determined based at least on the engine vibration measurement. For example, the vibration level of the fan rotor 12 may be determine based on filtering the engine vibration measurement. A tracking filter may be used for filtering the engine vibration measurement to obtain the vibration level of the fan rotor 12. The vibration level of the fan rotor 12 may be determine based on the engine vibration measurement and the fan rotor speed measurement. The fan rotor speed and/or the engine vibration parameter may be dynamically obtained in real time, may be obtained regularly in accordance with any predetermined time interval, or may be obtained irregularly. In some embodiments, the fan rotor speed and the engine vibration parameter are obtained via existing components as part of engine control and/or operation. For example, the fan rotor speed may be provided from an engine or aircraft computer that obtained the fan rotor speed from at least one sensor and/or the engine vibration parameter may be provided from an engine or aircraft computer that obtained the engine vibration parameter. In some embodiments, step 202 comprises triggering a measurement of the fan rotor speed and/or the vibrations of the engine 10 whenever method 300 is initiated. A rate of change of the fan rotor speed is determined from the obtained fan rotor speed. In some embodiments, the rate of change of the fan rotor speed is obtained instead of the fan rotor speed. For example, an aircraft computer or engine computer may compute the rate of change and transmit it directly to the computing device 400.

At step 204, the rate of change of the fan rotor speed is compared to the deceleration threshold and the engine vibration parameter is compared to the vibration threshold. At step 206, a structural failure of one of the fan blades 20 is detected when the engine vibration parameter exceeds the vibration threshold for a period of time and the rate of change of the fan rotor speed is below the deceleration threshold.

At step 208, an alert indicative of the structural failure is triggered, in response to detecting the structural failure. In some embodiments, triggering the alert comprises providing a visual display of the alert in a cockpit of an aircraft. The visual display of the alert is for informing a pilot in the cockpit of the aircraft of the type of engine failure. The pilot may then respond accordingly, such as by shutting down the engine 10.

In some embodiments, the method 300 further comprises, at step 210, outputting a shutdown command for shutting down the engine 10 in response to detecting the structural failure. In other words, the method 300 may automatically shut down the engine 10, rather than having the pilot shut down the engine 10 upon seeing the alert.

In some embodiments, the method further comprises, at step 212, outputting a command for starting a recorder to record one or more engine parameters. Recording of the engine parameter may be performed in response to an in-flight engine shutdown, in response to the rate of change of the fan rotor speed being below the deceleration threshold, in response to the engine vibration parameter exceeding the vibration threshold, and/or in response to detecting the structural failure. The engine parameter may be any predetermined engine parameter that may be used for monitoring normal operation of the engine 10. The recording of the engine parameter may be a continuous recording and/or a recording at a specific time.

Figure 3B:
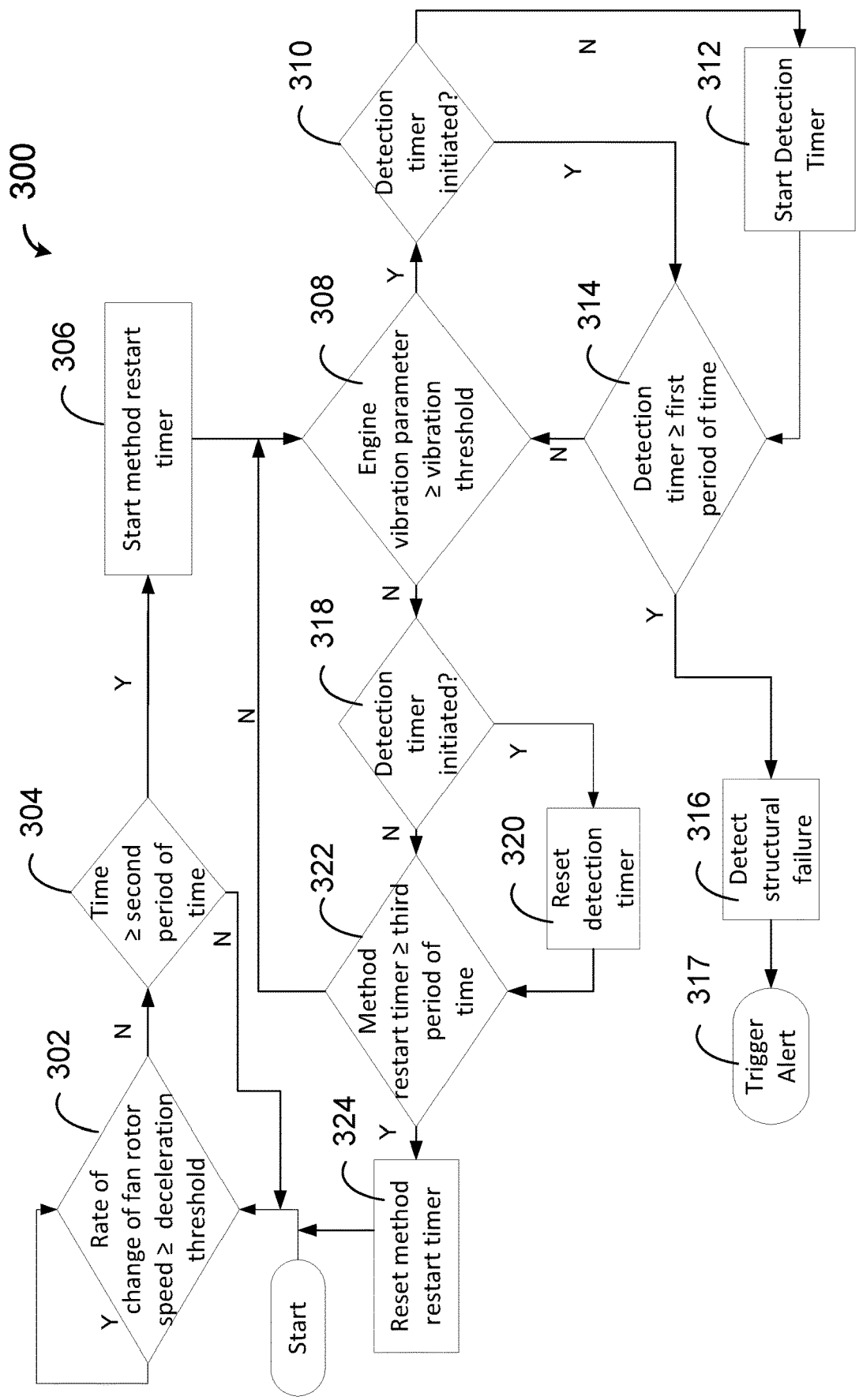
FIG. 3B is a flowchart illustrating another embodiment of the method for detecting structural failure of a fan blade, in accordance with an illustrative embodiment.

With additional reference to FIG. 3B there is illustrated another embodiment of the method 300 for detecting structural failure of a fan blade.

In some embodiments, the period of time at step 206 is a first period of time, and the method 300 comprises detecting the structural failure of the fan blade when the engine vibration parameter exceeds the vibration threshold for the first period of time and the rate of change of the fan rotor speed is below the deceleration threshold for a second period of time.

At step 302, the rate of change of the fan rotor speed is compared to the deceleration threshold. When the rate of change of the fan rotor speed meets or exceeds the deceleration threshold, step 302 is repeated. When the rate of change of the fan rotor speed is less than the deceleration threshold, then a first timer is started. In other words, the rate of change of the fan rotor speed is monitored to detect when the rate of change of the fan rotor speed falls below the deceleration threshold. The first timer is used to record the time that the rate of change of the fan rotor speed is less than the deceleration threshold. If the rate of change of the fan rotor speed meets or exceeds the deceleration threshold after being less than the deceleration threshold, then the first timer is restarted to zero.

At step 304, the time of the first timer is compared to a second period of time. When the time of the first timer exceeds the second period of time, this indicates that a structural failure of a fan blade may have occurred and that engine vibrations should be assessed to confirm if a structural failure of a fan blade has indeed occurred. When the time of the first timer does not exceed the second period of time, the method 300 returns to step 302.

At step 306, a method restart timer is started when the time of the first timer exceeds the second period of time. The method restart timer is used to reset the method 300 back to step 302 when the method 300 does not detect structural failure of at least one of the fan blades 20 within a given period of time. After the method restart timer is started at step 306, the method 300 proceeds to step 308.

In some embodiments, the method 300 comprises comparing the engine vibration parameter to the vibration threshold after the rate of change of the fan rotor speed is below the deceleration threshold for the second period of time. At step 308, the engine vibration parameter is compared to the vibration threshold.

In some embodiments, the method 300 comprises starting a detection timer when the engine vibration parameter exceeds the vibration threshold and resetting the detection timer to zero when the engine vibration parameter decreases below the vibration threshold. When the engine vibration parameter exceeds the vibration threshold, then an assessment is made at step 310 to determine if a detection timer has been initiated. If the detection timer is not initiated, then the detection timer is started at step 312 and the method 300 proceeds to step 314. If the detection timer has already been initiated, the method 300 proceeds to step 314. The detection timer is used to record the time that the engine vibration parameter continues to exceed the vibration threshold. The detection timer is reset to zero whenever the engine vibration parameter no longer exceeds the vibration threshold.

At step 314, the time of the detection timer is compared to the first period of time. When the time of the detection timer exceeds the first period of time, a structural failure of at least one of the fan blades 20 is detected at step 316. In response to the detection of the structural failure, an alert is then triggered at step 317. If the time of the detection timer has not exceeded the first period of time, then the method 300 returns to step 308. In other words, the engine vibration parameter is monitored (after detecting that the rate of change of the rotor speed falls below the deceleration threshold for the second period of time) to detect when engine vibration parameter exceeds the vibration threshold for the first period of time in order to detect a structural failure of the fan blades 20.

When the engine vibration parameter does not exceed the vibration threshold at step 308, then the method 300 proceeds to step 318. At step 318, an assessment is made to determine if the detection timer has been initiated. If the detection timer has been initiated, then the detection timer is reset to zero at step 320 and the method continues to step 322. If the detection timer has not been initiated at step 318, then the method 300 proceeds to step 322.

In some embodiments, the method 300 further comprises starting the method restart timer when the rate of change of the fan rotor speed is below the deceleration threshold for the second period of time and the method 300 comprises detecting the structural failure before the time of the method restart timer exceeds a third period of time. At step 322, the time of the method restart timer is compared to a third period of time. If the time of the method restart timer does not exceed the third period of time, then the method 300 proceeds to step 308. If the time of the method restart timer has exceeded the third period of time, then the method restart timer is reset at step 324 and the method restarts from step 302.

Figure 4:
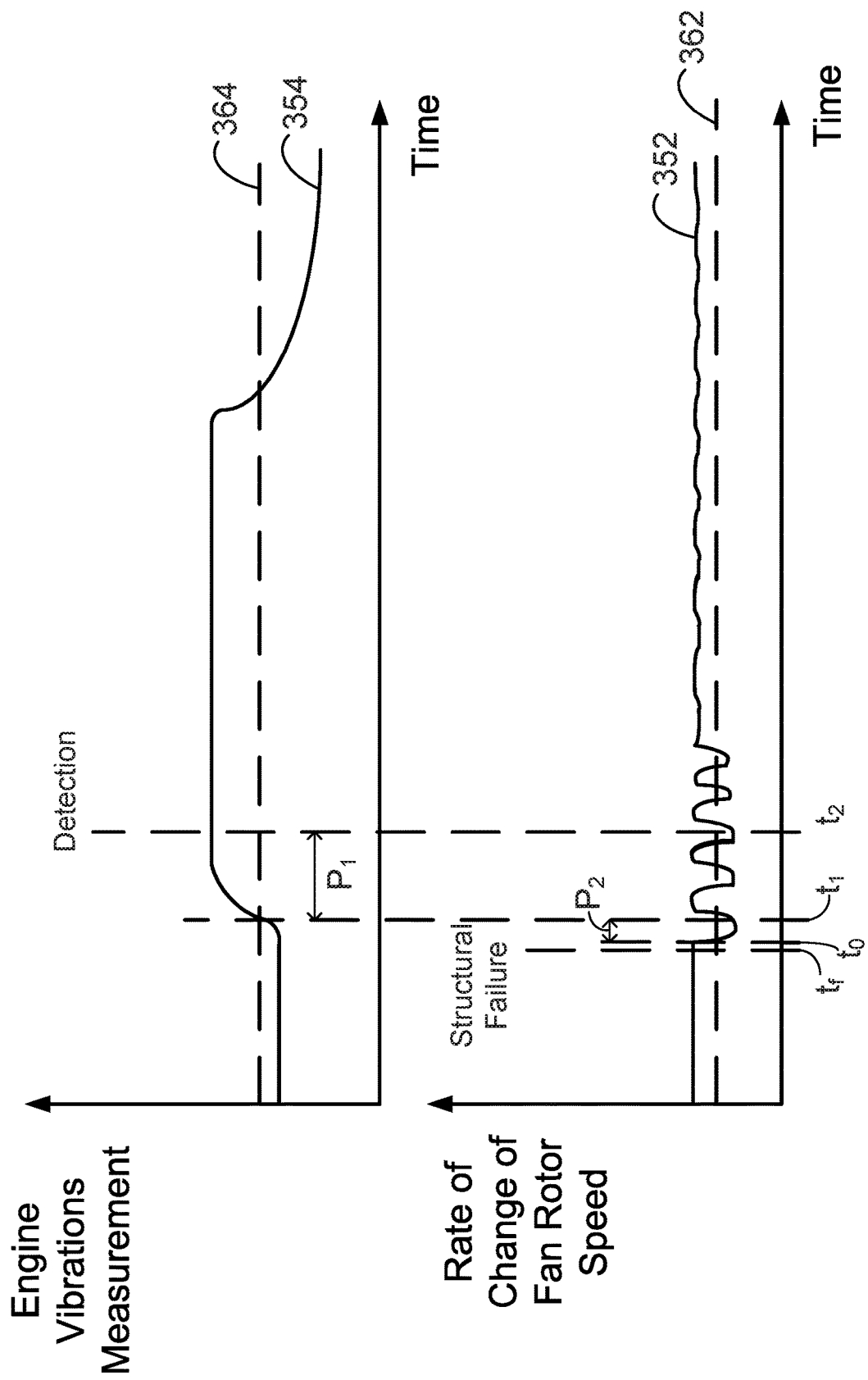
FIG. 4 illustrates example signals of engine vibrations and rate of change of fan rotor speed when a structural failure of a fan blade occurs, in accordance with an illustrative embodiment.

To further exemplify the detection method 300, reference is now made to FIG. 4. This figure illustrates example signals of the rate of change of the fan rotor speed 352 and the engine vibrations measurements 354 when a structural failure of a fan blade occurs. At time $t_f$, the structural failure occurs, which results in the rate of change of the fan rotor speed 352 having a fast deceleration and engine vibrations measurements 354 increasing relative to the normal operation prior to the structural failure. The rate of change of the fan rotor speed 352 is compared to the deceleration threshold 362 (step 302). At time $t_0$, the rate of change of the fan rotor speed 352 is less than the deceleration threshold 362 and the first timer is started. The time to detect the deceleration of the fan rotor 12 falling below the deceleration threshold occurs rapidly (e.g., 3 control cycles or approximately 60 ms). At time $t_1$, the time of the first timer exceeds the second period of time $P_2$ (step 304). The engine vibration measurement 354 is compared to the vibration threshold 364 (step 308). As the engine vibration measurement 354 exceeds the vibration threshold 364 at time $t_1$, the detection timer is initiated (step 312). At time $t_2$, the time of the detection timer exceeds the first period of time $P_1$ (step 314) and structural failure of a fan blade is detected (step 316).

The deceleration and vibration thresholds and the first, second and third periods of time may be set at any suitable value depending on the given engine type, engine model and/or engine configuration. Modeling, computer simulations, and/or physical fan blade off testing may be performed to determine the thresholds and periods of time for a given engine type, engine model and/or engine configuration. For example, fan rotor speed and the engine vibration parameter may be record for an engine being simulated and/or under physical testing of a fan blade off and the thresholds and the periods of time may be derived from the recorded measurements.

With reference to FIG. 5, an example of the computing device 400 is illustrated. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine controls (FADEC) or other similar device, including electronic engine control (EEC), engine control unit (EUC), and the like.

The methods and systems for detecting the structural failure of at least one fan blade described herein may be implemented in a high level procedural or object oriented programming or scripting language, or a combination thereof, to communicate with or assist in the operation of a computer system, for example the computing device 400. Alternatively, the methods and systems for detecting structural failure of at least one fan blade may be implemented in assembly or machine language. The language may be a compiled or interpreted language. Program code for implementing the methods and systems for detecting structural failure of at least one fan blade may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting structural failure of at least one fan blade may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and pre-defined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

It should be appreciated that by using both the rate of change of the fan rotor speed and the engine vibrations that the detection methods and systems described herein may be able to distinguish a structural failure of at least one fan blade from other engine events (e.g., such as bird ingestion, icing conditions, or high vibrations from remove engine failure transferred through the aircraft frame). Furthermore, by using both the rate of change of the fan rotor speed and the engine vibrations, this may avoid false detection, which may occur if only the rate of change of the fan rotor speed was used for detecting the structural failure of at least one fan blade.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting a structural failure of at least one fan blade may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting a structural failure of at least one fan blade of a fan rotor of an engine, the method comprising:
   obtaining a fan rotor speed and an engine vibration parameter;
   comparing a rate of change of the fan rotor speed to a deceleration threshold;
   after the rate of change of the fan rotor speed is below the deceleration threshold for a first period of time, comparing the engine vibration parameter to a vibration threshold;
   detecting the structural failure of the at least one fan blade after the engine vibration parameter exceeds the vibration threshold for a second period of time; and
   in response to detecting the structural failure, triggering an alert indicative of the structural failure of the at least one fan blade.

2. The method of claim 1, wherein comparing the engine vibration parameter to the vibration threshold comprises:
   starting a detection timer when the engine vibration parameter exceeds the vibration threshold; and
   resetting the detection timer to zero when the engine vibration parameter decreases below the vibration threshold.

3. The method of claim 2, wherein detecting the structural failure comprises detecting the structural failure when the detection timer exceeds the second period of time.

4. The method of claim 3, further comprising starting a method restart timer when the rate of change of the fan rotor speed is below the deceleration threshold for the first period of time, and wherein detecting the structural failure comprises detecting the structural failure before the method restart timer exceeds a third period of time.

5. The method of claim 1, wherein triggering the alert indicative of the structural failure comprises providing a visual display of the alert in a cockpit of an aircraft.

6. The method of claim 1, further comprising outputting a shutdown command for shutting down the engine in response to detecting the structural failure.

7. The method of claim 1, wherein the engine vibration parameter is an engine vibration measurement, and obtaining the engine vibration parameter comprises obtaining the engine vibration measurement from at least one vibration sensor.

8. The method of claim 1, wherein the engine vibration parameter is a vibration level of the fan rotor, and obtaining the engine vibration parameter comprises determining the vibration level of the fan rotor based on an engine vibration measurement obtained from at least one vibration sensor.

9. A system for detecting a structural failure of at least one fan blade of a fan rotor of an engine, the system comprising:
   a processing unit; and
   a non-transitory computer-readable memory having stored thereon program instructions executable by the processing unit for:
      obtaining a fan rotor speed and an engine vibration parameter;
      comparing a rate of change of the fan rotor speed to a deceleration threshold;
      when the rate of change of the fan rotor speed is below the deceleration threshold for a first period of time, comparing the engine vibration parameter to a vibration threshold;
      detecting the structural failure of the at least one fan blade when the engine vibration parameter exceeds the vibration threshold for a second period of time; and
      in response to detecting the structural failure, triggering an alert indicative of the structural failure of the at least one fan blade.

10. The system of claim 9, wherein comparing the engine vibration parameter to the vibration threshold comprises:
    starting a detection timer when the engine vibration parameter exceeds the vibration threshold; and
    resetting the detection timer to zero when the engine vibration parameter decreases below the vibration threshold.

11. The system of claim 10, wherein detecting the structural failure comprises detecting the structural failure when the detection timer exceeds the second period of time.

12. The system of claim 11, wherein the program instructions are further executable by the processing unit for starting a method restart timer when the rate of change of the fan rotor speed is below the deceleration threshold for the first period of time, and wherein detecting the structural failure comprises detecting the structural failure before the method restart timer exceeds a third period of time.

13. The system of claim 9, wherein triggering the alert indicative of the structural failure comprises providing a visual display of the alert in a cockpit of an aircraft.

14. The system of claim 9, wherein the program instructions are further executable by the processing unit for outputting a shutdown command for shutting down the engine in response to detecting the structural failure.

15. The system of claim 9, wherein the engine vibration parameter is an engine vibration measurement, and obtaining the engine vibration parameter comprises obtaining the engine vibration measurement from at least one vibration sensor.

16. The system of claim 9, wherein the engine vibration parameter is a vibration level of the fan rotor, and obtaining the engine vibration parameter comprises determining the vibration level of the fan rotor based on an engine vibration measurement obtained from at least one vibration sensor.

\* \* \* \* \*